Aug. 19, 1947.  J. JANDASEK  2,426,103
TURBINE TYPE ROTARY FLUID COUPLING AND TORQUE CONVERTER
Filed Sept. 30, 1940
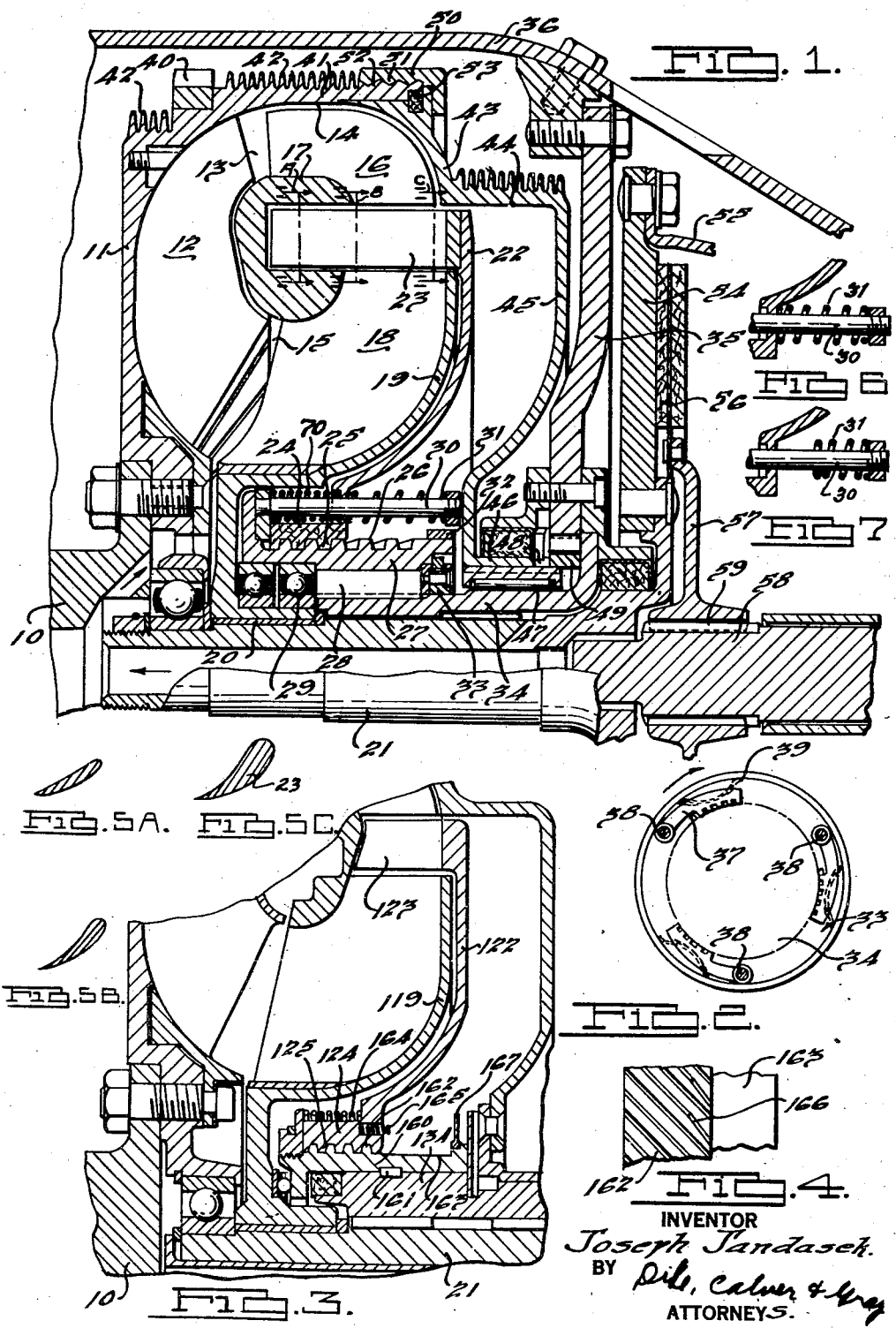
INVENTOR
Joseph Jandasek.
BY
ATTORNEYS.

Patented Aug. 19, 1947

2,426,103

UNITED STATES PATENT OFFICE 2,426,103

TURBINE TYPE ROTARY FLUID COUPLING AND TORQUE CONVERTER

Joseph Jandasek, Detroit, Mich., assignor to Bendix Aviation Corporation, South Bend, Ind., a corporation of Delaware Application September 30, 1940, Serial No. 358,960

9 Claims. (Cl. 60—54)

1

This invention relates to transmissions and more particularly to a fluid transmission capable of automatically operating as a torque converter or as a fluid coupling dependent on the relative speeds of rotation and loads on the driving and driven members.

An object of this invention is to provide a fluid transmission having an axially shiftable guide wheel subjected to fluid reaction within the transmission, wherein the guide wheel is so mounted relative to a driving or a driven shaft that when the driven shaft is subjected to heavy loads the guide wheel is moved to an operative position whereby the unit functions as a torque converter, but when the driven shaft is subjected to light loads the fluid reaction exerted on the guide wheel moves the guide wheel structure to another position whereupon the device operates as a fluid coupling.

Another object of the invention resides in the provision of a novel guide wheel structure having helically formed vanes of varying contour for use in fluid transmissions wherein means operable automatically under the influence of fluid reaction are provided to automatically position the guide wheel in the fluid circuit in such a manner as to transmit power from the driving to the driven shaft at maximum efficiency.

A further object is to provide a one-way clutch and braking structure for the axially shiftable reaction member of a fluid transmission wherein the one-way clutch and braking means control the axial position of the reaction member in accordance with variations of speed and load of the driving and driven shafts of the transmission.

A still further object is to provide a fluid transmission with a shiftable reaction member capable of transferring the unit from a fluid coupling to a torque converter, and wherein a braking structure is associated with the reaction member to assist in moving the guide wheel axially at the instant when the operation of the device changes from that of a torque converter to a fluid coupling and vice versa.

Another object of this invention resides in the provision of novel resilient means associated with an axially movable reaction or guide wheel member to shift the guide wheel member axially when the fluid reaction in the circuit is not sufficiently strong to overcome the force exerted by the resilient means whereupon the device is transformed from a torque converter to a fluid coupling before the fluid reaction in the circuit approaches the zero point.

Other objects of this invention will appear in

2 the following description and appended claims, reference being had to the accompanying drawings forming a part of this specification wherein like reference characters designate corresponding parts in the several views.

Fig. 1 is a sectional view illustrating one desirable form of my transmission device.

Fig. 2 is a side elevation of the braking structure illustrated in Fig. 1.

Fig. 3 is a side elevation of a modified form of the invention.

Fig 4 is a plan view of a portion of the hub construction of Fig. 3.

Figs. 5A, 5B and 5C are sectional views taken substantially on the lines A, B and C respectively of Fig. 1.

Figs. 6 and 7 are sectional views showing resilient means of variable tension for urging the guide wheel into the power transmitting fluid circuit.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to Fig. 1 it will be observed that a driving shaft or member 10 is provided with an impeller web 11. The impeller webb 11 carries impeller blades 12 which lie within an impeller channel 13. The impeller channel 13 is interposed between and aligned with a first stage turbine channel 14 and a second stage turbine channel 15.

The first stage turbine channel 14 is provided with first stage turbine vanes 16 carried by a turbine shroud 17. The shroud 17 is also provided with second stage turbine vanes 18 positioned to lie within the second stage turbine channel 15. The second stage turbine vanes 18 are fixed to a turbine web 19. The turbine web 19 may be fixed in any suitable manner such for example as by splines 20 to a driven shaft 21 in axial alignment with the driving shaft 10.

A guide wheel web 22 may be axially shiftable relative to the driven shaft 21 and the turbine web 19 to interpose a guide wheel 23 between the first and second stage turbines 16 and 18 respectively. The guide wheel 23 may if desired be relatively long axially as illustrated and be provided with vanes of varying contour and pitch as illustrated in Figs. 5A, B and C whereby the operation of the unit may be progressively transformed from that of a torque converter with the guide wheel 23 in the position illustrated, to that of a fluid clutch when the guide wheel 23 is moved axially to the full extent of its retractile position. The shape of the blades carried by the guide wheel 23 may be in the form of a helix with the angle of the blades being relatively small at the torque converter portion as illustrated in Fig. 5C and progressively increased at the clutch portion as illustrated in Fig. 5A whereby the fluid may flow more freely through the guide wheel when the device is operating as a clutch.

The guide wheel web 22 is provided with a hub 24 having an internal helical thread 25 which engages an external helical thread 26 carried by a member 27 rotatably mounted on a one-way brake 28 and suitable bearings 29.

A plurality of axially extending studs 30 are mounted in the guide wheel web 22 and are provided with suitable resilient means 70 yieldingly urging the guide wheel member toward the right to operate the transmission as a fluid clutch, and resilient means 31 of varying length as illustrated in Figs. 6 and 7 to provide progressively increasing force resisting outward movement of the guide wheel relative to the fluid circuit to balance the force of the springs 70 and yieldingly urge the guide wheel 23 toward a substantially mid-point in the circuit. The axial force exerted by the springs 31 approximately balances the axial thrust exerted on the vanes 23 due to their helical contour. A suitable abutment 32 is provided to limit the outward movement of the guide wheel hub 24 and web 22.

Braking means 33 may be interposed between the rotatable member 27 and an axially extending stationary member 34 carried by a radially extending housing 35 which in turn is suitably fastened to a cover plate 36. The body member of the braking means 33 may be fixed to the rotatable member 27 by sweating, welding, pressing, etc. As more clearly illustrated in Fig. 2 the braking structure 33 includes a plurality of independently operable brake shoes 37 pivotally mounted on suitable pins 38 and yieldingly urged into engagement with the stationary member 34 by means of suitable springs 39. It will be observed that when the device is operating at low speeds the brake shoes 37 engage the outer periphery of the stationary member 34 to exert a braking force thereagainst to retard rotation of the member 27 which carries the external helix 26. The differential of speed between the guide wheel 23 and the rotatable member 27 moves the guide wheel web 22 and the guide wheel 23 axially out of or into the fluid circuit. Since the brake shoes 37 are pivoted on the pins 38 as illustrated in Fig. 2, greater braking force will be exerted when the member 27 is rotating in the forward direction than will be exerted when the member 27 is rotating in the reverse direction because of the servo or self energizing action of the brake structure. When the speed of rotation of the rotatable member 27 reaches a substantially predetermined point the centrifugal force or weight of the brake shoes 37 yieldingly urges the springs 39 outwardly whereupon the brake shoes 37 disengage the stationary member 34 and the braking structure is inoperative. In the operation of this device the one-way brake means 28 interposed between the stationary sleeve 34 and the rotatable member 27 locks the guide wheel hub 24 and the guide wheel against backward rotation to operate the device as a torque converter to transmit power with increased torque multiplication. When torque multiplication is not required the fluid reaction in the power transmitting fluid circuit decreases to zero whereupon the fluid reaction exerted on the back of the guide wheel blades coupled with the drag of the blades in the power transmitting fluid circuit initiates forward rotation of the guide wheel member.

Forward rotation of the guide wheel is permitted because of the one-way braking means 28. Since the member 27 is free to rotate on the one-way braking means 28, the guide wheel member would not be moved axially on the helical threads unless some means were provided to restrain the member 27 against rotation. The braking means 33 interposed between the stationary member 34 and the rotatable member 27 is operative to exert friction on the stationary member to restrain rotation of the rotatable member 27. The brake shoes 37 pivotally mounted on the pins 38 are operative to exert sufficient braking force on the rotatable member 27 to permit the force exerted by the fluid reaction in the power transmitting fluid circuit to rotate the guide wheel hub 24 on the member 27 to move the guide wheel member carried thereby axially relative to the power transmitting circuit to transform the device to operate as a turbo clutch. As the speed of rotation of the member 27 increases on the one-way braking means 28 the brake shoes 37 are urged outwardly against the resistance of the springs 39 to disengage the stationary member 34 and the device is free to operate as a turbo clutch.

The impeller web 11 may be provided with a suitable starter ring gear 40 and the web preferably terminates in a cylindrical axially extending portion 41 having radially extending rigidifying and cooling vanes 42 extending therefrom. A cover plate 43 having a cylindrical axially extending portion 44 to receive the guide wheel web 22 and a portion of the guide wheel 23 may be carried by a radially extending flange 45 which terminates in a suitable sleeve 46 mounted on suitable bearings 47 associated with the stationary member 34. The sleeve 46 is provided with suitable driving means such for example as projections 48 operably connected to drive a gear 49 of a gear pump employed for circulating fluid through the unit.

The cover plate 43 is connected to the cylindrical portion 41 of the impeller web 11 by means of a large nut 50 having internal threads 51 engaging external threads 52 carried by the cylindrical portion 41, suitable sealing means 53 being interposed between the cylindrical portion 41 and the cover plate 43.

The driven shaft 21 is preferably provided with a radially extending disk 54 which carries a clutch cover plate. The disk 54 is provided with a suitable friction surface against which clutch facing 56 carried by a radially extending flange 57 may be urged. The radially extending flange 57 is suitably connected to a final driven shaft 58 in any suitable manner such for example as by splines 59.

The embodiment of the invention illustrated in Figs. 3 and 4 is similar in many respects to that illustrated in Fig. 1. Corresponding parts have therefore been given corresponding reference numerals with the addition of 100.

The guide wheel web 122 is provided with a hub member 124 having internal helical threads 125 axially shiftable on an axially extending cylindrical member 160 suitably secured to a sleeve 134 by a key 161 or other suitable means.

The member 160 is provided with external helical threads 162 which mesh with the internal helical threads 125 of the hub member 124. The external helical threads 162 extend over approximately one-half of the axial length of the member 160 so that the hub member 124 may engage the helical threads 162 to hold the guide wheel web 122 and the guide wheel 123 stationary whereupon the device operates as a torque converter to transmit power.

When the reaction of the fluid circulating in the fluid channel decreases to a substantially predetermined value, the guide wheel 123 rotates with the impeller and turbine whereupon the helical threads 125 of the hub member 124 shift the hub 124 axially on the member 160 thereby substantially withdrawing the guide wheel 123 from the fluid circuit. When the hub member 124 approaches the extreme position the internal helical threads 125 disengage the external threads 162 whereupon the guide wheel may float or rotate freely and the device operates as a fluid coupling to transmit power at a substantially 1:1 ratio. The internal surfaces of the helical threads 125 engage the external surface 163 of the member 160 which acts as a suitable bearing surface to guide the hub member 124 relative to the member 160.

Means including a spring 164 are provided to yieldingly urge the guide wheel web 122 out of the fluid circuit. In this manner the movement of the guide wheel out of the fluid circuit is initiated before the fluid reaction in the circuit drops to zero. The device may thus be transformed from a torque converter to a fluid coupling while it is still operating at a relatively high efficiency as a torque converter without the necessity of waiting for the fluid reaction to drop to substantially zero at which time the efficiency of the device would be substantially reduced.

Yielding means such for example as springs 165 may be provided to cooperate with the inner edge of the guide wheel member projecting into the power transmitting fluid circuit to yieldingly urge the guide wheel 123 into the fluid circuit to transform the device from a fluid clutch to a torque converter. The outer ends of the external helical threads 162 may be bevelled as illustrated at 166 of Fig. 4, and the inner ends of the internal threads 125 of the hub 124 may be bevelled in a similar manner to facilitate the reengagement of the hub with the spline portion of the member 160 when the fluid reaction increases to a substantially predetermined point. The ends of the springs 165 may engage a flange 167 carried by the member 160 to yieldingly urge the guide wheel web 124 toward engagement with the external helix of the member 160.

It will be understood that various features disclosed in the different views of this application may be combined with corresponding features of other figures without departing from the spirit of my invention.

This application is a continuation-in-part of my co-pending application Serial No. 588,163, filed January 22, 1932, now Patent No. 2,222,618, granted November 26, 1940.

I claim:

1. A fluid transmission comprising a driving shaft, an impeller thereon, a driven shaft, a turbine thereon, said impeller and turbine cooperating to provide a fluid circuit, a stationary member, a guide wheel including wide vanes of varied contour and pitch movable in the circuit, means whereby the guide wheel may shift between two extreme positions relative to the fluid circuit under the influence of fluid reaction in the fluid circuit, yielding means urging the guide wheel towards one of said extreme positions relative to the fluid circuit to initiate movement of the guide wheel towards said position relative to the fluid circuit to operate the unit as a clutch before the fluid reaction in the fluid circuit drops to zero, one way braking means between the stationary member and the guide wheel, and centrifugally operated braking means controlled by the speed of rotation of the guide wheel to influence the position of the guide wheel.

2. A fluid transmission comprising rotatable impeller and turbine members cooperating to provide a power transmitting fluid circuit, a stationary member, a guide wheel mounted on the stationary member and having vanes of varied contour and pitch adapted to be moved into the fluid circuit to operate the transmission as a torque converter in one positoin and in another position to operate it as a fluid coupling, one-way braking means between the guide wheel member and the stationary member, and centrifugally actuated braking means responsive to the speed of rotation of the guide wheel member to influence the position of the guide wheel member.

3. A fluid transmission comprising impeller and turbine members cooperating to provide a power transmitting fluid circuit, a stationary member, a guide wheel thereon including vanes of varied contour and pitch movable in the circuit to operate the transmission as a torque converter or as a fluid coupling, one-way driving means between the guide wheel and the stationary member to hold the guide wheel member against rotation when the transmission is operating as a torque converter, and centrifugally actuated braking means operative during initial rotation of the guide wheel member when the transmission is to be transformed to operate as a fluid coupling to shift the guide wheel member axially on the stationary member to operate the transmission as a fluid coupling.

4. A fluid transmission comprising impeller and turbine members cooperating to provide a power transmitting fluid circuit, a stationary member, a guide wheel including vanes of varied contour and pitch cooperating with the impeller and turbine members to operate the transmission as a torque converter or as a fluid coupling, and a speed responsive braking means between the guide wheel and the stationary member adapted to operate at low speeds of rotation of the guide wheel to transform the transmission to operate as a fluid coupling and to be ineffective at higher speeds of rotation of the guide wheel when the transmission is operating as a fluid coupling.

5. A fluid transmission comprising impeller and turbine members cooperating to provide a power transmitting fluid circuit, a stationary member, a guide wheel including vanes of varied contour and pitch movable in the circuit and cooperating with the impeller and turbine members to operate the transmission as a torque converter or as a fluid coupling, one-way braking means between the guide wheel member and the stationary member, and friction inducing means operative at low speeds of the guide wheel member interposed between the stationary member and the guide wheel member.

6. A fluid transmission comprising rotatable impeller and turbine means providing a fluid circuit, a guide wheel having vanes of substantial width and gradually varied contour and pitch shiftably movable in the fluid circuit to operate the unit as a torque converter or as a fluid coupling, a stationary member, one-way driving means associated with the guide wheel and stationary member to lock the guide wheel against rotation to operate the unit as a torque converter when the fluid reaction in the fluid circuit is above a substantially predetermined value and to permit the guide wheel to rotate freely when the fluid reaction in the fluid circuit is below said substantially predetermined value to operate the unit as a fluid coupling, and yielding means positioned on opposite sides of the guide wheel to position the vanes in a substantially mid position in the fluid circuit.

7. A fluid transmission unit comprising a driving shaft, a driven shaft, impeller and turbine wheels fixed to the driving and driven shafts and cooperating to provide a fluid circuit, a guide wheel having vanes of substantial width and gradually varied contour and pitch movable in the circuit, a stationary member supporting the guide wheel, a one-way braking means between the guide wheel and stationary member whereby the guide wheel may be held against rotation to maintain the blades in the fluid circuit in such a position as to operate the unit as a torque converter and to release the guide wheel for free rotation of the vanes in the fluid circuit to operate the unit as a fluid coupling.

8. A fluid transmission comprising an impeller and a turbine providing a fluid circuit, and vanes movable in the circuit each having gradually varied contour and pitch and being of substantial width so that one portion of the vanes is in the fluid circuit during one phase of operation of the transmission and another portion is in the circuit during another phase of operation.

9. A fluid transmission comprising an impeller and a turbine providing in conjunction with one another a fluid power transmitting circuit, and a shiftable member having thereon vanes movable in the circuit, said vanes gradually increasing in pitch and constantly changing in contour from their free ends to their juncture with the shiftable member and being of such substantial width that for every increment of change in the transmission operating conditions a different portion of the vanes is in the fluid circuit, the variance between said portion and previous portion of vanes in the circuit being directly proportional to said increment of change in transmission operating conditions or load on the driven shaft.

JOSEPH JANDASEK.

REFERENCES CITED

The following references are of record in the file of this patent:

UNITED STATES PATENTS

| Number | Name | Date |
| --- | --- | --- |
| 2,222,618 | Jandasek | Nov. 26, 1940 |
| 2,168,863 | de Lavaud | Aug. 8, 1939 |
| 2,182,394 | Bucy | Dec. 5, 1939 |
| 2,235,370 | Jandasek | Mar. 18, 1941 |
| 1,760,480 | Coats | May 27, 1930 |
| 2,037,252 | Martyrer | Apr. 14, 1936 |
| 2,162,543 | Banner | June 13, 1939 |
| 1,901,910 | Johnson | Mar. 21, 1933 |
| 1,813,078 | Nyrop | July 7, 1931 |
| 273,837 | Hansell | Mar. 13, 1883 |
| 2,293,767 | Salerni | Aug. 25, 1942 |
| 2,351,517 | Jandasek | June 13, 1944 |

FOREIGN PATENTS

| Number | Country | Date |
| --- | --- | --- |
| 433,858 | Great Britain | 1935 |